United States Patent [19]
Hatano et al.

[11] Patent Number: 6,069,564
[45] Date of Patent: May 30, 2000

[54] MULTI-DIRECTIONAL RFID ANTENNA

[76] Inventors: Richard Hatano, 2000 Encina Dr., #3;
Brian Monahan, 1865 Rodriguez St., both of Santa Cruz, Calif. 95062;
Christopher R. Kilgus, 11455 Oceanview Ave., Felton, Calif. 95018

[21] Appl. No.: 09/149,887

[22] Filed: Sep. 8, 1998

[51] Int. Cl.[7] .................................................. G08B 13/14
[52] U.S. Cl. ................................... 340/572.7; 340/572.8; 343/867; 343/742
[58] Field of Search ............................. 340/572.7, 572.8, 340/572.5, 825.54; 343/866, 867, 741, 742

[56] References Cited

U.S. PATENT DOCUMENTS

| | | | |
|---|---|---|---|
| 2,399,382 | 4/1946 | Polydoroff | 250/33 |
| 3,838,409 | 9/1974 | Minasy et al. | 340/572 |
| 4,272,083 | 6/1981 | Tomoeda | 340/572 |
| 4,654,658 | 3/1987 | Walton | 340/825.54 |
| 5,258,766 | 11/1993 | Murdoch | 340/572 X |
| 5,621,199 | 4/1997 | Calari et al. | 235/375 |
| 5,923,300 | 7/1999 | Mejia | 343/788 |

*Primary Examiner*—Daniel J. Wu
*Assistant Examiner*—Sihong Huang
*Attorney, Agent, or Firm*—Francis Law Group

[57] ABSTRACT

A multi-directional RFID read/write antenna unit is described which provides multi-directional RF communication to a source, such as a RF tag. The antenna comprises a plurality of coils adapted to transmit multi-directional RF signals to a RF tag and receive RF response signals from the RF tag. The RF antenna includes a switch for selecting at least one of the RF antenna coils for transmission of the RF signals and receipt of the RF response signals whereby the RF signals can be directed toward and received from a plurality of different directions from a fixed position.

13 Claims, 8 Drawing Sheets

MULTI-DIRECTIONAL RFID ANTENNA

FIELD OF THE INVENTION

The present invention relates in general to radio frequency identification (RFID) devices, and more particularly to a multi-directional RFID antenna.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transceiver receives its power from the base station or interrogator, such as the identification system disclosed in U.S. Pat. No. 4,654,658.

A typical RFID system is made up of reusable tags fixed to or embedded in product carriers, RFID read or RFID read/write antenna units that communicate with the tags via a RF link and a controller. The host (or computer) system interfaces with the controller and directs the interrogation of the tags.

The RFID system thus provides effective means of identifying, monitoring and controlling materials in a closed loop process. In a factory environment, the tags are employed as the transport mechanism between "islands of automation," providing a record of each process which can be acted upon immediately or downloaded later for analysis.

In operation, as a tag passes near a RFID antenna unit, an antenna emits RF signals towards the tag. The emitted RF signals induce a current in the tag. The current powers-up the tag, thereby enabling the tag to transmit response signals from the tag to the antenna unit.

The tags can also be powered by an internal battery (i.e., an "active" tag). The life span of an active tag is, however, generally limited by the lifetime of the battery.

Commonly, RFID antenna units are placed on standard mountings built into the manufacturing facility. These standard mountings are located throughout the manufacturing facility wherever monitoring devices may be needed.

Often, the mountings require that the RFID antenna unit(s) be placed into cramped locations. Thus, conventional RFID antenna units are typically separated into two distinct portions, a unidirectional antenna portion and the read/write electronics portion. The two distinct portions of the unit are connected to each other by, for example, a cable or other extended electrical connector. Such cable or other extended electrical connectors crowd the manufacturing environment, serve as a source of power loss, and are a source of electrical noise. In addition to the noise generated by the cable or other extended electrical connectors, noise is also generated by the reader power supply. The generated noise can make it difficult to receive clear response signals transmitted by the tagged item.

In addition to the problems associated with cables or other extended electrical connectors, in many instances, due to the placement of the standard mountings, numerous unidirectional antenna units must be located in close proximity to the path of the item to be monitored. That is, because the antenna portion is attached to standard mountings, the uni-directional antenna unit may not always be focused directly towards the path of the tagged item. Thus, in order to insure that the tag disposed on an item is incident with the RF signals emitted from the unidirectional antenna, several antenna units are required.

Several approaches have been employed to address the aforementioned problems associated with conventional RFID systems, employing a unidirectional antenna. Illustrative is the RFID reader unit disclosed in U.S. Pat. No. 5,621,199, assigned to Escort Memory Systems, Scotts Valley, Calif.

In U.S. Pat. No. 5,621,199, a RFID reader unit is disclosed having an antenna containing head portion and read/write electronics-containing body portion integrated into a single, compact structure. The antenna-containing head portion is also rotatably adjustable to enhance the unidirectional antenna coverage. The noted head and, hence, antenna adjustment is however achieved manually.

It is therefore an object of the present invention to provide a multi-directional antenna which can be readily employed in a RFID unit to enhance RF transmission coverage.

It is a further object of the present invention to provide a multi-directional antenna which can be employed in a RFID unit and readily focused in a multitude of directions.

It is yet another object of the present invention to provide a multi-directional antenna which can be employed in a RFID unit to eliminate the need for numerous additional RFID antenna units.

SUMMARY OF THE INVENTION

In accordance with the above objects and those that will be mentioned and will become apparent below, the multi-directional antenna in accordance with this invention comprises a plurality of coils oriented on different axes and adapted to transmit multidirectional RF signals to a RF tag and receive RF response signals from the RF tag. The RF antenna includes switching means for selecting at least one of the RF antenna coils for transmission of the RF signals and receipt of the RF response signals whereby the RF signals can be directed toward and received from a plurality of different directions from a fixed position.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

The multi-directional antenna of the present invention substantially reduces or eliminates the disadvantages and shortcomings associated with prior art uni-directional antennas. According to the invention, the multi-directional antenna comprises a plurality of antenna coils oriented on different predetermined axes (or planes) to enhance the RF transmission coverage of RFID read or read/write units.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claim.

Figure 1:
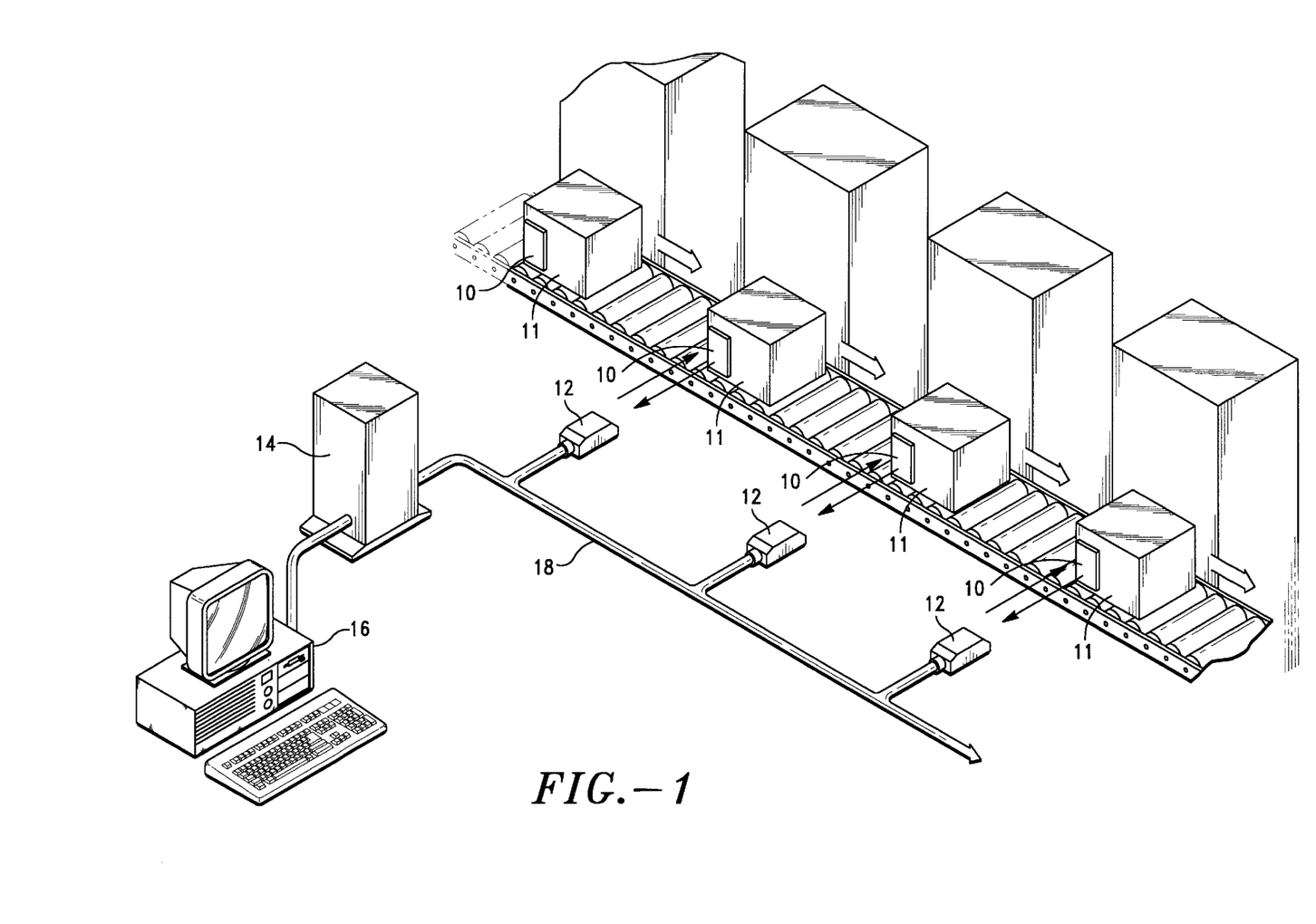
FIG. 1 is a schematic illustration of a typical RFID system.

Referring first to FIG. 1, there is shown a simple read/write RFID system. The system typically comprises one or more tags (or transponders) 10, containing some data in memory, at least one antenna 12 to communicate with the tags 10, and a controller 14 for managing the communication interface. The host system 16 interfaces with the controller 14 and directs the interrogation of the tags 10 disposed on or embedded in the product carriers 11 and any following action via parallel, serial or bus communications 18.

Figure 2:
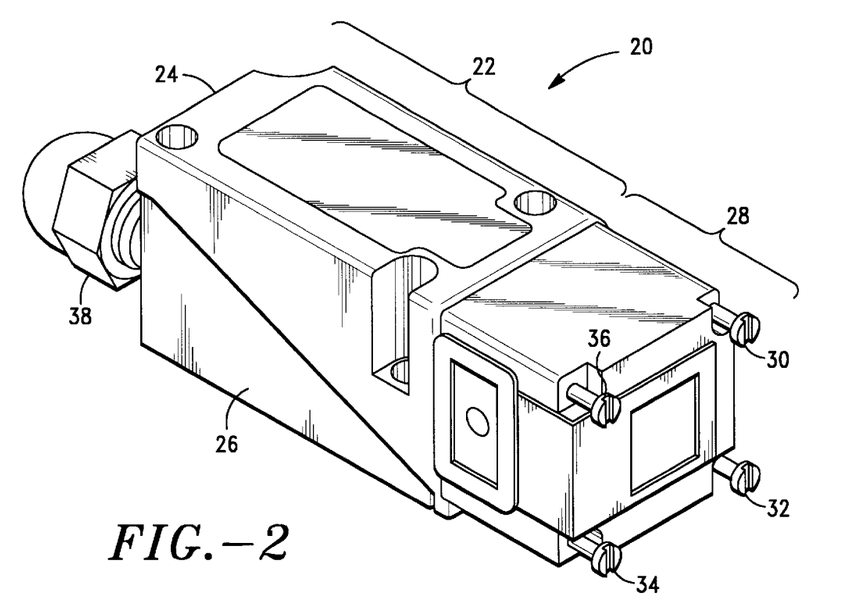
FIG. 2 is a perspective view of a RFID antenna unit.

Referring now to FIG. 2, there is shown a perspective view of a conventional RFID antenna unit 20 incorporating the multi-directional (i.e., multiple-axis) antenna of the present invention. As will be appreciated by one having ordinary skill in the art, the unique multi-directional antenna of the present invention may be readily employed in most conventional RFID read or read/write antenna units, having separate or integral heads. The RFID antenna unit 20 shown in FIG. 2 and described in detail in U.S. Pat. No. 5,621,199 is thus for illustrative purposes only.

The antenna unit 20 includes a body portion 22 formed of two halves, upper half 24 and lower half 26, and an integral, rotatably adjustable head portion 28. The body portion 22 contains the read/write electronics, while head portion 28 contains the unique multi-directional antenna of the invention. The antenna unit 20 also includes gland nut 38 for providing a liquid-tight seal between an interfacing cable, not shown, and an opening, not shown, in body portion 22 for receiving the interfacing cable.

As illustrated in FIG. 2, the rotatably adjustable head portion 28 of the noted antenna unit 20 is attached to body portion 22 using screws 30, 32, 34 and 36. That is, when screws 30, 32, 34 and 36 are loosened, head portion 28 can be rotated in 90° increments to focus the internal antenna towards a desired direction. This was, and remains, particularly advantageous for conventional uni-directional (i.e., single coil) antennas. Further details of the manually adjustable head 28 are set forth in U.S. Pat. No. 5,621,199, which is incorporated by reference herein.

As discussed in detail below, the multi-directional antenna of the present invention eliminates the need to manually adjust the head 28, while providing optimum RF coverage. Indeed, the unique programmable multi-directional antenna can be employed in conjunction with a separate head, an integral stationery head or the rotatably adjustable head 28 shown in FIG. 2.

Figure 3:
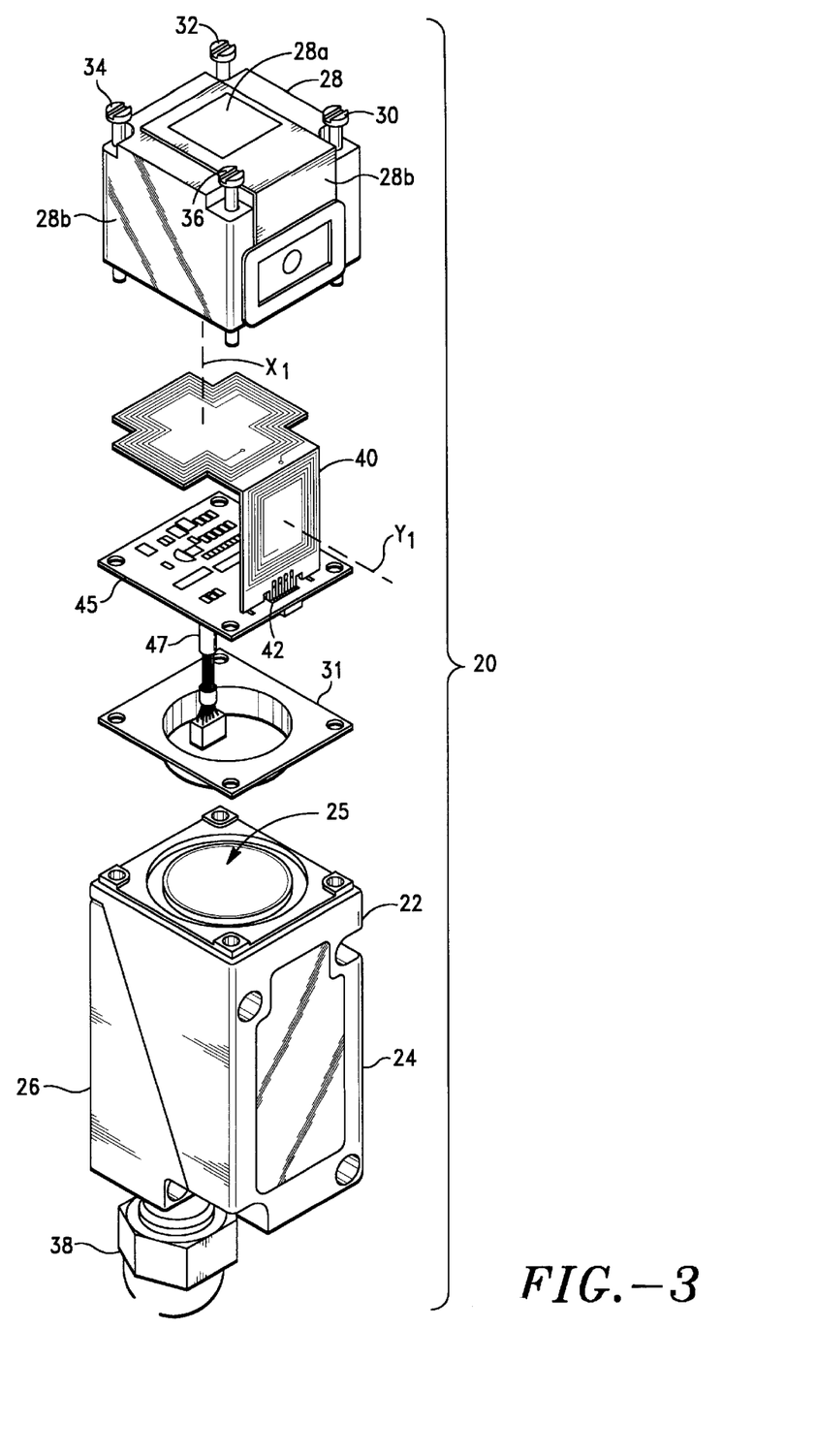
FIG. 3 is an exploded, perspective view of the RFID antenna unit shown in FIG. 2 incorporating the multi-directional antenna in accordance with the present invention.

Referring now to FIG. 3, there is shown the antenna unit 20, incorporating the multi-directional antenna 40 of the invention, with the head portion 28 extracted from body portion 22. According to the invention, the unique multi-directional (i.e., multiple-axis) ferrite antenna 40 and associated circuitry, discussed in detail below, is preferably disposed within the head 28 and is adapted to transmit multi-directional RF signals to a source, such as a RF tag, and receive RF response signals from the source.

The antenna 40 is preferably connected to circuit board 45 via terminals 42. The circuit board 45 contains the antenna switching means and read/write circuitry.

As illustrated in FIG. 3, the circuit board 45 is provided with an internal electrical connector 47 which is routed through interface plate 31 and the circular access hole 25 of the antenna body portion 22. The electrical connector 47 connects the antenna switching means and read/write circuitry to the digital circuitry 65 disposed within the body portion 22.

Figure 4A:
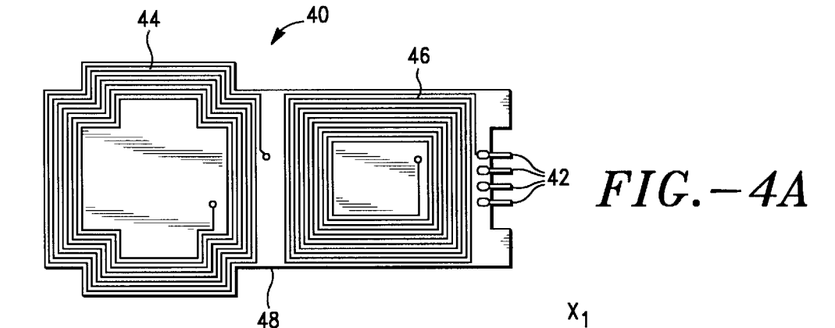
FIG. 4A is a plan view of one embodiment of the multi-directional antenna in accordance with the invention.
Figure 4B:
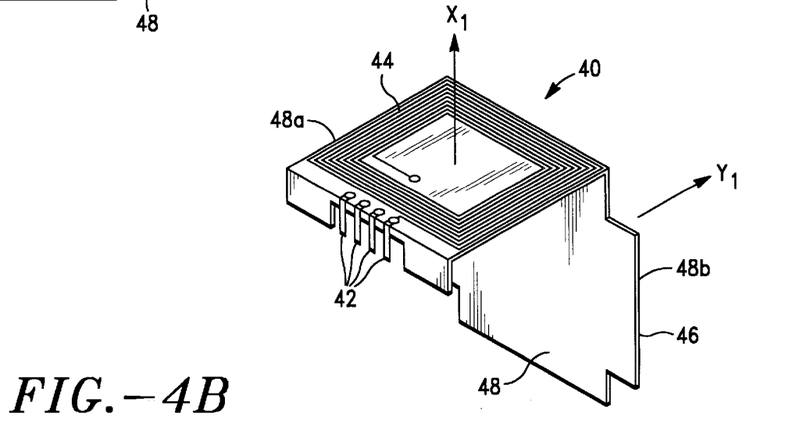
FIG. 4B is a perspective view of the multi-directional antenna shown in FIG. 4A, illustrating the final, pre-assembly configuration of the antenna in accordance with the invention.

Referring now to FIGS. 4A and 4B, there is shown one embodiment of the multi-directional antenna 40 of the invention. As illustrated in FIG. 4A, the antenna 40 preferably comprises a plurality of etched copper coils 44, 46 which are integrally formed into a flexible substrate 48 constructed of polyamide, Mylar™ or like materials. As will be appreciated by one having ordinary skill in the art, the coils 44, 46 may also comprise a wire wrapped ferrite or like material, which is integrally formed into a flexible substrate, or an "air coil", which eliminates the need for a substrate (see FIG. 9).

In a preferred embodiment, the antenna substrate 48 is formed at an angle of substantially 90° with a respective coil 44, 46 disposed proximate each side 48a, 48b (see FIG. 4B). As illustrated in FIG. 3, two (2) axes $x_1$, $y_1$, are thus employed to provide RF communication to and from a source on the $x_1$ axis (i.e., top 28a of the head 28) and $y_1$ axis (i.e., sides 28b of the head 28).

Referring now to FIGS. 5A–8B, there are shown additional embodiments of the multi-directional antenna according to the invention. In the embodiment shown in FIGS. 5A and 5B, the antenna 60 comprises a flexible substrate 61 with five (5) integrally formed etched copper coils 62a–62e. The coils 62a–62e are preferably oriented with a central coil 62e and the remaining four (4) coils 62a–62d disposed proximate the central coil 62e in a substantially cross (i.e., +) shaped orientation.

Figure 5A:
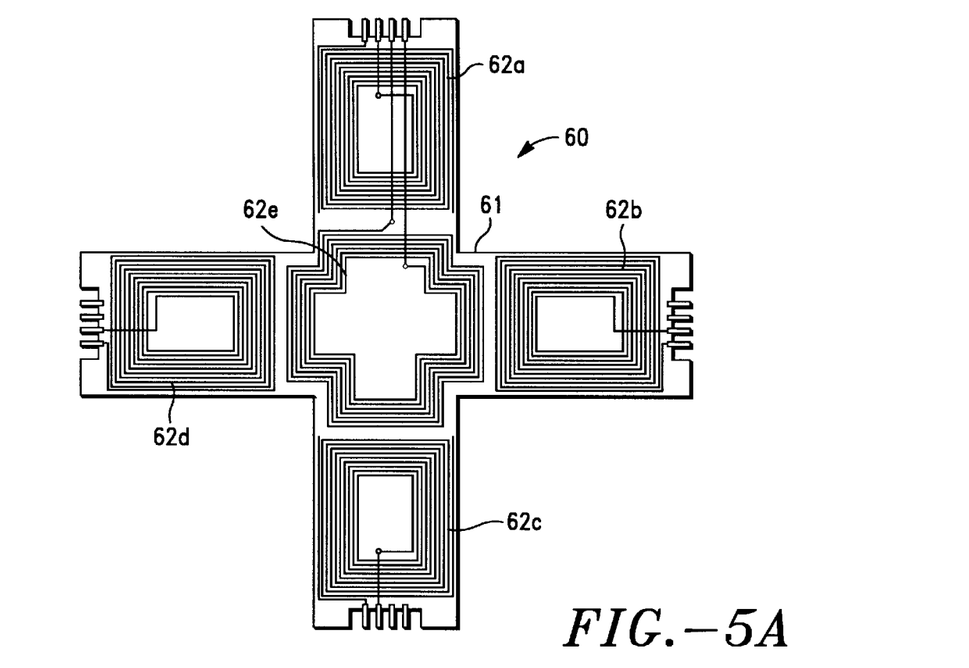
FIG. 5A is a plan view of an additional embodiment of the multi-directional antenna in accordance with the invention.
Figure 5B:
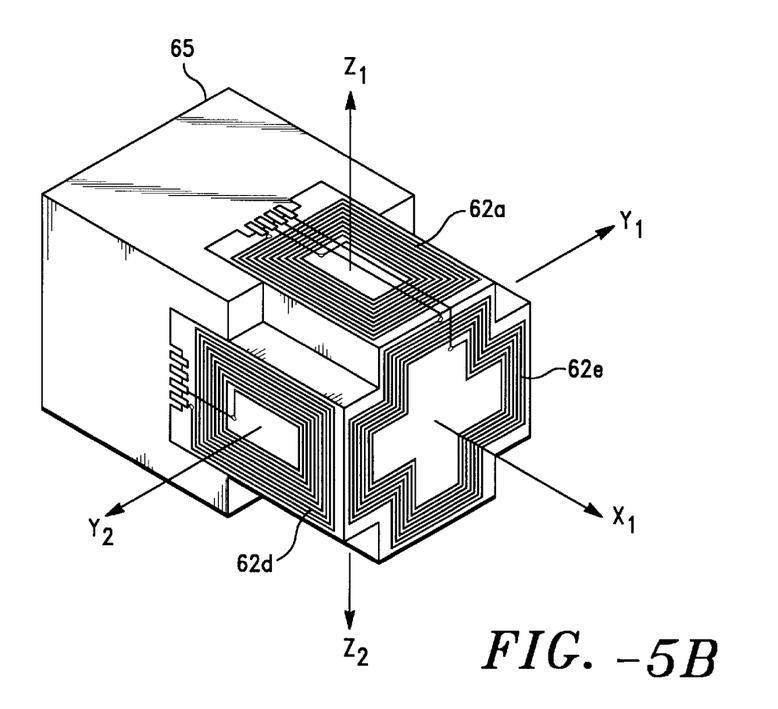
FIG. 5B is a perspective view of the antenna shown in FIG. 5A, illustrating the final, pre-assembly configuration of the antenna in accordance with the invention.

As illustrated in FIG. 5B, the antenna substrate 61 is bent proximate the adjoining edges of the central coil 62e and coils 62a–62d, whereby an angle of approx. 90° is formed between each coil 62a–62d and central coil 62e. Five (5) axes $x_1$, $y_1$ $y_2$, $z_1$, $z_2$ are thus employed to provide multi-directional RF communication to and from a source.

To prevent interference between the coils 62a–62e, the coils 62a–62e are embodied in a removable shield 65. The shield 65 is preferably constructed of ferrite or other suitable shielding material.

Figure 6A:
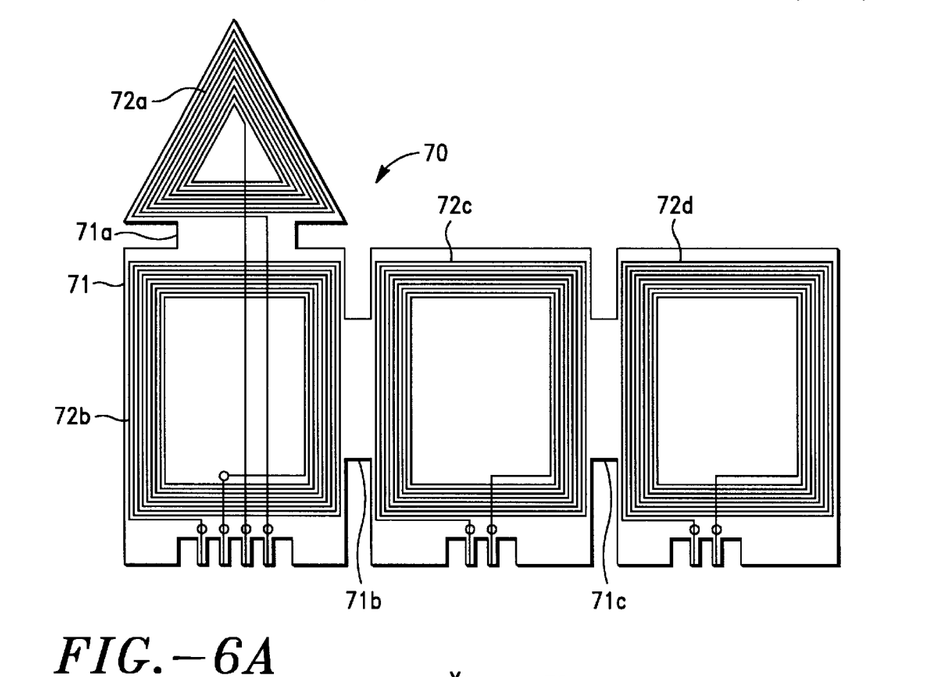
FIG. 6A is a plan view of an additional embodiment of the multi-directional antenna in accordance with the invention.
Figure 6B:
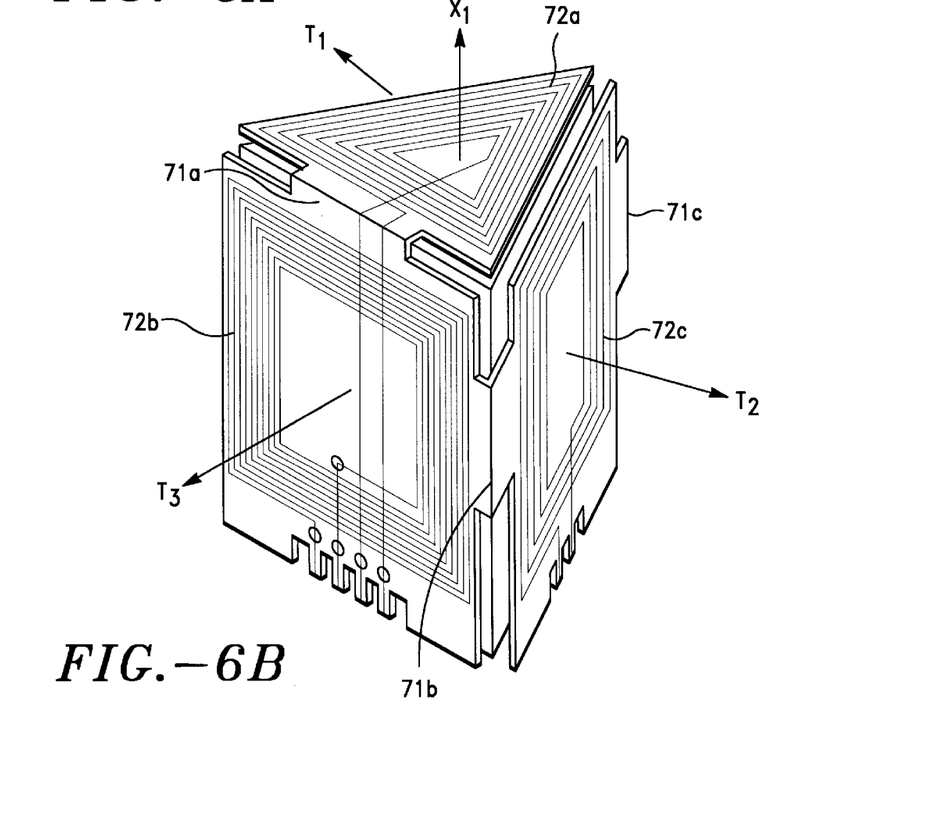
FIG. 6B is a perspective view of the antenna shown in FIG. 6A, illustrating the final, pre-assembly configuration of the antenna in accordance with the invention.

Referring now to FIGS. 6A and 6B, there is shown an additional embodiment of the multi-directional antenna, according to the invention. In the noted embodiment, the antenna 70 comprises a flexible substrate 71 with four (4) integrally formed etched copper coils 72a–72d; coils 72b–72d having a substantially rectangular shape and coil 72a having a substantially triangular shape.

As illustrated in FIG. 6b, the substrate 71 is bent inwardly at points 71a, 71b and 71c, to form a substantially triangular shaped box structure. Four (4) axes $x_1$, $t_1$, $t_2$ and $t_3$ are thus employed to provide multi-directional RF communication to and from source.

Figures 7A, 7B:
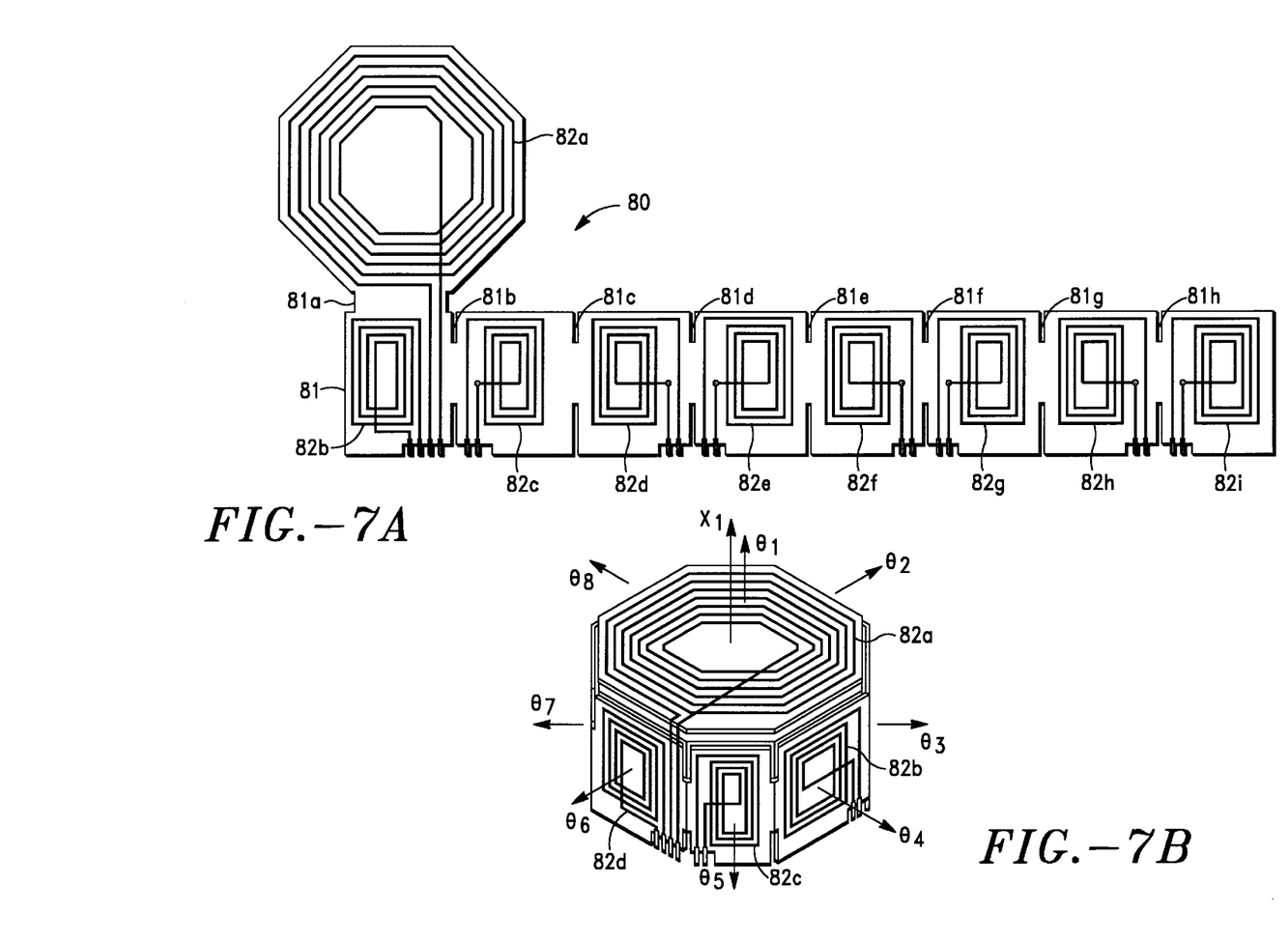
FIG. 7A is a plan view of an additional embodiment of the multi-directional antenna in accordance with the invention.
FIG. 7B is a perspective view of the antenna shown in FIG. 7A, illustrating the final, pre-assembly configuration of the antenna in accordance with the invention.

Referring now to FIGS. 7A and 7B, there is shown yet another embodiment of the multi-directional antenna, according to the invention. In the noted embodiment, the antenna 80 comprises a flexible substrate 81 with nine (9) integrally formed etched copper coils 82a–82i. Coils 82b–82$_i$ having a substantially rectangular shape and coil 82a having a substantially octagonal shape.

As illustrated in FIG. 7b, the substrate 81 is bent inwardly at points 81a, 81b, 81c, 81d, 81e, 81f, 81g and 81h to form a substantially octagonal shaped box structure. Nine (9) axes x, $Ø_1$, $Ø_2$, $Ø_3$, $Ø_4$, $Ø_5$, $Ø_6$, $Ø_7$ and $Ø_8$ are thus employed to provide multi-directional RF communication to and from a source.

Figure 8A:
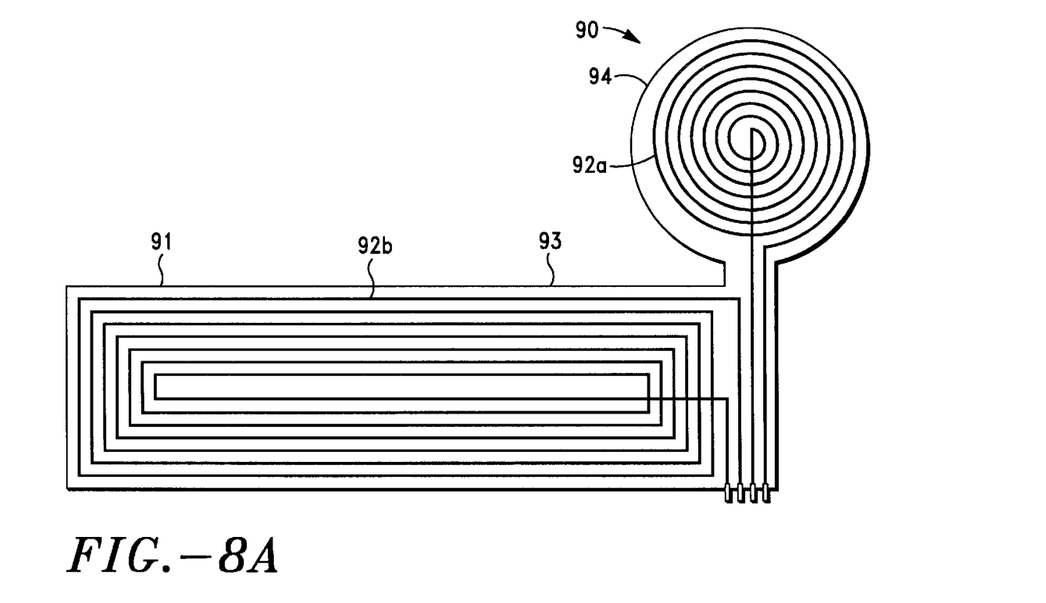
FIG. 8A is a plan view of an additional embodiment of the multi-directional antenna in accordance with the invention.
Figure 8B:
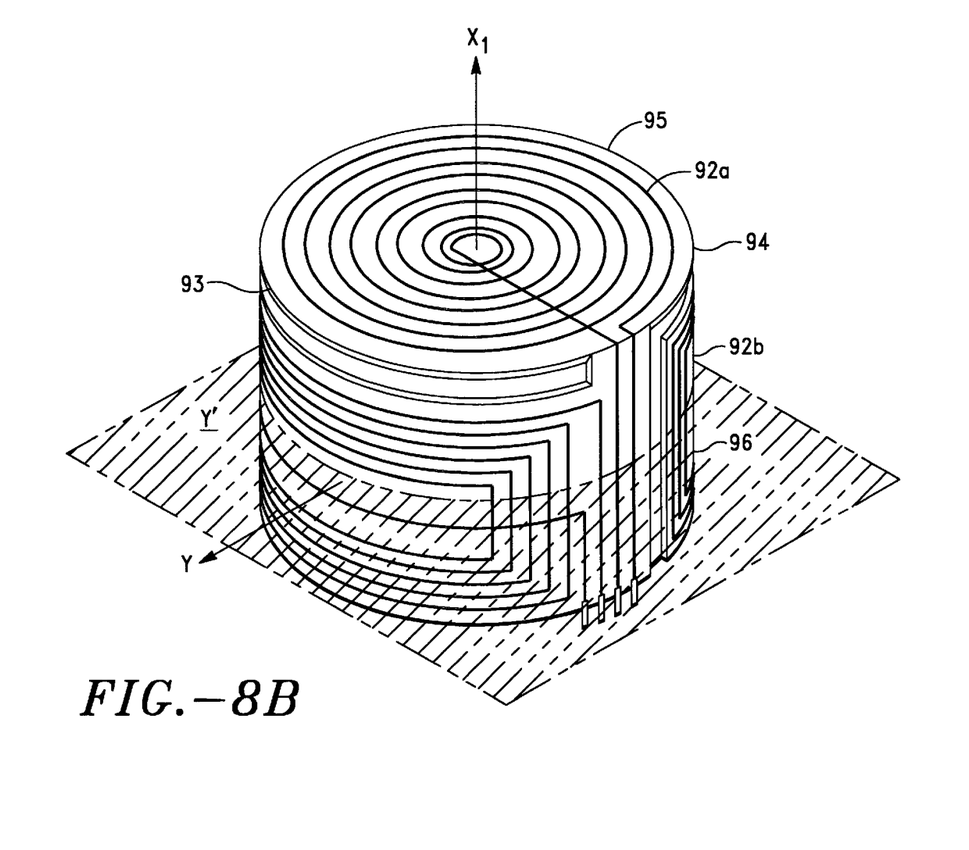
FIG. 8B is a perspective view of the antenna shown in FIG. 8A, illustrating the final, pre-assembly configuration of the antenna in accordance with the invention.

Referring now to FIGS. 8a and 8b, there is shown a further embodiment of the multi-directional antenna, according to the invention. In the noted embodiment, the antenna 90 comprises flexible substrate 91 with two (2) integrally formed etched copper coils 92a, 92b; coil 92a having a substantially circular shape and coil 92b having an elongated, substantially rectangular shape.

As illustrated in FIG. 8b, the substrate 91 is bent proximate the adjoining edges of coils 92a and 92b. Coil 92b is then bent inwardly such that the inside edge 93 of coil 92b is proximate the outside edge 94 of coil 92a. A substantially circular shaped structure is thus formed having a top 95, comprising coil 92a, and a continuous circular side wall 96, comprising coil 92b. The noted structure accordingly provides RF communication to and from a source (i) along axis $x_1$, and (ii) communication substantially coincident to the $y_1$ plane (denoted y).

As will be appreciated by one having ordinary skill in the art, the unique multidirectional antenna can comprise additional envisioned planar and box-shaped structures. Further, as stated above, the antenna coils may be formed in the noted shapes with or without a substrate. Illustrative is the antenna embodiment shown in FIG. 9.

Figure 9:
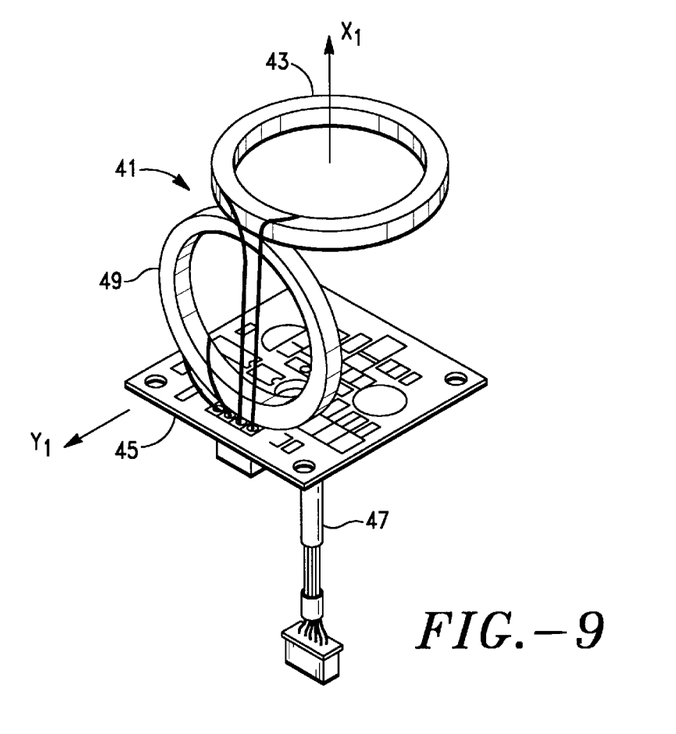
FIG. 9 is a perspective view of yet another embodiment of the multi-directional antenna illustrating a plurality of air coils in accordance with the invention.

In the noted embodiment, the antenna 41 comprises two substantially circular air coils 43, 49. As illustrated in FIG. 9, the coils 43, 49 are bent inwardly at an angle of approximately 90°. Two (2) axes $x_1$, $y_1$ are thus similarly employed to provide RF communication to and from a source (see FIG. 3).

According to the invention, antenna switching means are provided to select the desired coil and, hence, axis (or plane) of RF communication. As will be appreciated by one having ordinary skill in the art, various switching means, such as a mechanical switch, a multiplexing circuit or microprocessor (i.e., programming) means, may be S employed within the scope of the invention to achieve the desired antenna coil switching capability and characteristics. In a preferred embodiment, discussed below, the switching means comprises mechanical switching means 55.

Figure 10:
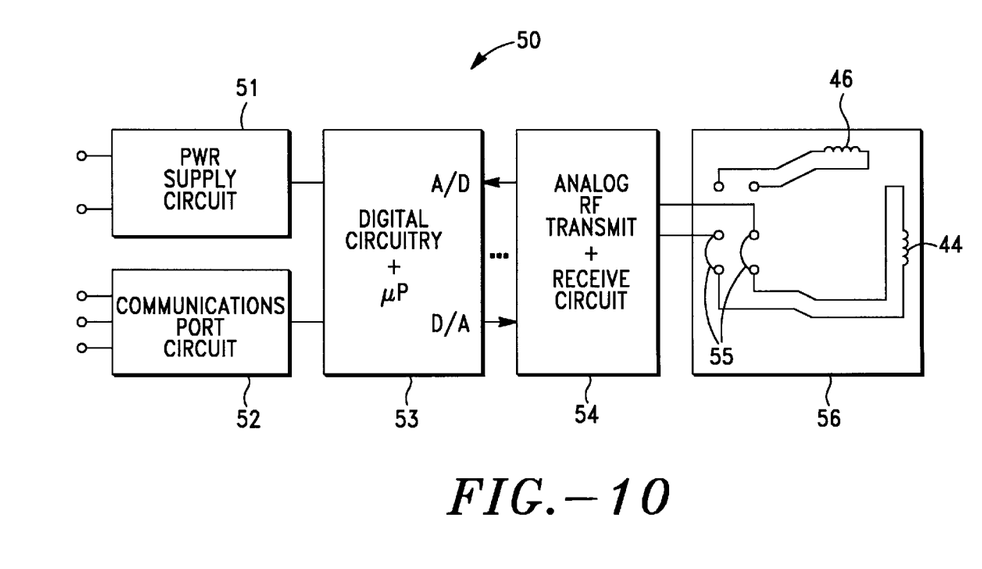
FIG. 10 is a schematic diagram of the RFID antenna unit circuitry in accordance with the present invention.

Referring now to FIG. 10, there is a shown a schematic diagram of the preferred antenna unit circuitry 50. The circuitry 50 includes a power supply 5 1, a communications port circuit 52, digital circuitry 53, including microprocessor means for controlling the RF signals transmitted to the source (i.e., tag) and processing the RF response signals from the source, analog read/write (i.e., transmit/receive) circuitry 66 for transmitting and receiving RF signals to and from the antenna (e.g., antenna 40) and antenna circuitry 56. According to the invention, the antenna circuitry 56 includes antenna switching means, such as the mechanical switches 55, and a plurality of antenna coils, such as coils 44, 46 illustrated in FIGS. 3 and 4B.

Since the antenna unit circuitry 50 is integrated into a single, compact structure, no extended electrical connections are required between the digital circuitry 53 and read/write circuitry 54. As a result, the antenna unit 20 does not suffer from significant power loss or electrical noise during the transfer of signals between the digital 53 and analog 54 circuitry, as found in conventional two-piece RF reader units.

The present invention thus provides a multi-directional antenna which can be employed in a conventional RFID read or read/write unit, with or without an integral head unit, to provide optimum RF coverage. As discussed above, the multi-directional antenna allows the RFID unit to provide RF communication to and from a source in almost any direction regardless of the position in which the RFID unit is mounted. As a result, the present invention eliminates the requirement for numerous additional RFID units to obtain desired antenna coverage.

Further, since the antenna-containing head portion and the read/write electronics-containing body portion can be integrated to a single, compact, structure, the RFID unit can be placed into cramped locations which are too small for conventional RFID units.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multi-directional RF antenna for a RFID unit, comprising:

a substrate having multiple sides defining a plurality of planes, each of said planes having an axis, said substrate including an antenna coil disposed on each of said substrate sides, said antenna coils being oriented on different axes, each of said coils being adapted to transmit and receive RF signals substantially unidirectional and substantially coincident a respective one of said axes; and antenna switching means in communication with said antenna coils for selecting at least one of said antenna coils for transmission and receipt of said RF signals whereby said RF signals can be selectively directed toward and received from a plurality of different directions from a fixed position.

2. The RF antenna of claim 1, wherein said substrate comprises a polyamide.

3. The RF antenna of claim 2, wherein said coils comprise etched copper coils integrally formed on said polyamide substrate.

4. The RF antenna of claim 1, wherein said switching means provides for substantially uni-directional RF signal transmission and receipt from a selected one of said coils.

5. The RF antenna of claim 1, wherein said switching means provides for substantially simultaneous RF signal transmission and receipt from said coils.

6. A RFID unit for communicating with a RF tag, comprising:

a multi-directional RF antenna adapted to transmit multi-directional RF signals to said RF tag and receive RF response signals from said RF tag, said RF antenna comprising a substrate having multiple sides defining a plurality of planes, each of said planes having an axis, said substrate including an antenna coil disposed on each of said substrate sides, said antenna coils being oriented on different axes, each of said coils being adapted to transmit and receive RF signals substantially unidirectional and substantially coincident a respective one of said axes, said RF antenna including switching means in communication with said antenna coils for selecting at least one of said antenna coils for transmission of said RF signals and receipt of said RF response signals;

a rotatable head portion, said head portion containing said RF antenna and read/write circuitry means in communication with said RF antenna for transmitting said RF signals to and receiving said tag RF response signals from said RF antenna; and a body portion in communication with said head portion, said body portion containing digital circuitry means in communication with said read/write circuitry means for processing said tag RF response signals and controlling said RF signals.

7. The RFID unit of claim 6, wherein said switching means provides for substantially simultaneous multi-directional RF signal transmission and receipt of said RF tag response signals from said plurality of said antenna coils.

8. The RFID unit of claim 6, wherein said switching means provides for uni-directional RF signal transmission and receipt of said tag RF response signals from a selected one of said antenna coils.

9. The RFID unit of claim 6, wherein said antenna comprises two coils.

10. The RFID unit of claim 6, wherein said antenna comprises five coils.

11. The RFID unit of claim 6, wherein said antenna includes a polyamide substrate.

12. The RFID unit of claim 11, wherein said coils comprise etched copper coils integrally formed on said polyamide substrate.

13. The RFID unit of claim 12, wherein said coils are oriented at an angle of approximately 90° to each other.

* * * * *